(12) United States Patent
Amend et al.

(10) Patent No.: US 9,351,503 B2
(45) Date of Patent: May 31, 2016

(54) FROZEN CONFECTIONERY PRODUCT WITH A PEELABLE GEL COATING AND METHOD FOR MANUFACTURING SAME

(71) Applicant: NESTEC S.A., Vevey (CH)

(72) Inventors: Thomas Aloisius Valentinus Amend, Mountain View, CA (US); Pannarai Hemasthiti, Nonthaburi (TH)

(73) Assignee: Nestec S.A., Vevey (CH)

( * ) Notice: Subject to any disclaimer, the term of this patent is extended or adjusted under 35 U.S.C. 154(b) by 11 days.

(21) Appl. No.: 14/354,831

(22) PCT Filed: Oct. 18, 2012

(86) PCT No.: PCT/EP2012/070607
§ 371 (c)(1),
(2) Date: Apr. 28, 2014

(87) PCT Pub. No.: WO2013/064376
PCT Pub. Date: May 10, 2013

(65) Prior Publication Data
US 2014/0255558 A1      Sep. 11, 2014

(30) Foreign Application Priority Data

Oct. 31, 2011 (EP) .................................. 11187231

(51) Int. Cl.
| | |
|---|---|
| *A23G 9/48* | (2006.01) |
| *A23G 9/50* | (2006.01) |
| *A23G 9/08* | (2006.01) |
| *A23G 9/32* | (2006.01) |
| *A23G 9/34* | (2006.01) |

(52) U.S. Cl.
CPC ................ *A23G 9/083* (2013.01); *A23G 9/322* (2013.01); *A23G 9/34* (2013.01); *A23G 9/48* (2013.01); *A23G 9/485* (2013.01); *A23G 9/503* (2013.01)

(58) Field of Classification Search
USPC ......................................... 426/139, 565, 573
See application file for complete search history.

(56) References Cited

U.S. PATENT DOCUMENTS

| | | | |
|---|---|---|---|
| 1,429,405 A | 9/1922 | Carter et al. | |
| 2,112,173 A | 3/1938 | Broaddus | |

(Continued)

FOREIGN PATENT DOCUMENTS

| | | |
|---|---|---|
| CN | 200976814 | 11/2007 |
| EP | 1767099 | 3/2007 |

(Continued)

OTHER PUBLICATIONS

Awesome 1000 Awesome Things "#908 Peeling an orange in one shot" pp. 1-9, Oct. 2008-Sep. 2011 http://1000awesomethings.com/2008/10/28/908-peeling-an-orange-in-one-shot/.*

(Continued)

*Primary Examiner* — Kelly Bekker
(74) *Attorney, Agent, or Firm* — K&L Gates LLP

(57) ABSTRACT

The present invention relates to a frozen confectionery product comprising a core consisting of a frozen confection, wherein the core is at least partially coated with a frozen flexible edible gel coating, said gel coating being provided with at least one cutting line allowing to peel-off the gel-coating, characterized in that the gel coating comprises at least two visually distinctive gel layers. The invention also relates to a method for making such a product.

16 Claims, 2 Drawing Sheets

(56) References Cited

U.S. PATENT DOCUMENTS

| | | | |
|---|---|---|---|
| 2,801,922 | A | 8/1957 | Oprean |
| 3,752,678 | A | 8/1973 | Jenkinson et al. |
| 4,911,937 | A * | 3/1990 | Crosello et al. ............. 426/103 |
| 6,379,724 | B1 | 4/2002 | Best et al. |
| 6,548,097 | B1 * | 4/2003 | Best et al. ................... 426/565 |
| 6,645,538 | B2 | 11/2003 | Best et al. |
| 2002/0192337 | A1 | 12/2002 | Best et al. |
| 2009/0130264 | A1 | 5/2009 | Bartkowska et al. |

FOREIGN PATENT DOCUMENTS

| | | |
|---|---|---|
| EP | 2025241 | 2/2009 |
| WO | 0241702 | 5/2002 |
| WO | 02071862 | 9/2002 |

OTHER PUBLICATIONS

Levenstein("Orange Peel Origami Gets Paper Folding Foodies Juiced" pp. 1-5 Jan. 21, 2011 http://inventorspot.com/articles/orange_peel_origami_gets_paper_fold.*

Nestle's first peelable ice cream rolls out worldwide, Nestle Global, Feb. 16, 2011, 2 pages.

Chinese Office Action for Application No. 201280053241.1, dated Mar. 10, 2015, 11 pages.

"Peel a Pop," GNPD, Jul. 1, 2008, XP002684430. 1 page.

Search Report for international application PCT/EP2012/0633368 mailed Feb. 27, 2013, pp. 1-3.

Written Opinion for international application PCT/EP2012/0633368 mailed Feb. 27, 2013, pp. 1-4.

"Spiral." Oxford English Dictionary First Edition. 1914. <http://www.oed.com/view/Entry/186804 ?isAdvanced=false&result=1 &rskey=XITPaB&> Accessed May 27, 2015, pp. 1-10.

* cited by examiner

US 9,351,503 B2

FROZEN CONFECTIONERY PRODUCT WITH A PEELABLE GEL COATING AND METHOD FOR MANUFACTURING SAME

CROSS REFERENCE TO RELATED APPLICATIONS

The present application is a National Stage of International Application No. PCT/EP2012/070607, filed on Oct. 18, 2012, which claims priority to European Patent Application No. 11187231.3, filed Oct. 31, 2011, the entire contents of which are being incorporated herein by reference.

FIELD OF THE INVENTION

The present invention relates to a frozen confectionery product with a peelable gel coating and to a method and an apparatus for manufacturing the same.

BACKGROUND OF THE INVENTION

Frozen confectionery products consisting entirely of a frozen gel or comprising a frozen gel are already known and are popular in particular with children.

One example for a frozen confectionery product comprising a core consisting of a frozen confection, said core being at least partially coated with a frozen flexible edible gel coating or layer, is the frozen dessert stick "Eskimo Monkey" which is sold by Nestlé Thailand. This product comprises an ice-cream core being coated with a frozen flexible edible gel layer. This gel layer can be peeled of by the consumer and eaten separately. Since the gel is resistant to liquefaction, even in the defrosted state, the product parts that have been peeled down by the consumer remain intact without melting and dripping. To facilitate the peeling, four longitudinal cutting lines are provided in the gel layer, so that four flaps of peel can be peeled off. One thereby achieves a banana-style peeling effect.

As it becomes clear from the above, an important feature of the gel used to form the peelable gel layer is that it resists to meltdown even after complete defrosting. This is achieved by the addition of stabilisers such as locust bean gum, kappa-carrageenan, sodium alginate or pectin to the mix. EP 1339290 A2 describes such a jelly or gel and its use in a composite frozen confectionery product. The content of this document is incorporated herein by reference.

So far there exist only products allowing a very simple peeling effect.

OBJECT OF THE INVENTION

It is thus the object of the present invention to provide a novel and appealing frozen confectionery product giving a different experience to Consumers.

SUMMARY OF THE INVENTION

This object is achieved by the product according to claim 1 and the method according to claim 14.

The frozen confectionery product according to the invention comprises a core consisting of a frozen confection which is at least partially coated with a frozen flexible edible gel coating. This coating is provided with at least one cutting line allowing peel off the gel coating at least partially.

The product according to the invention is characterized in that the gel coating comprises at least two visually distinctive gel layers. The two gel layers can for example have different colors, so that an interesting optical effect is achieved.

It has been found that when the two gel layers are frozen in two separate steps, they show little adhesion between each other, so that they can in principle be peeled off separately by a consumer. Whether or not this is actually done and convenient will depend on the thickness of the layers and on the adhesion between the layers which is influenced by various process parameters and by the temperature of the product during peeling.

It is thus also possible that the two layers stick together during peeling, so that the consumer has the impression of peeling off one gel layer that has different colors on the outside and on the inside.

The cutting line does not necessarily have to extend through the complete gel coating. In particular, according to one embodiment of the invention, it is possible that the depth of the cutting line or lines corresponds to the thickness of an outer gel layer. In this case, the gel coating can be peeled off partially, i.e. only the outer gel layer can be peeled off, while the inner gel layer, which is not provided with any cutting lines, remains intact.

According to a preferred embodiment of the invention, several cutting lines extending longitudinally across the gel coating are provided, so that the coating can be peeled off by pulling down stripes, similar to peeling a banana. As mentioned above, it is possible that all of the layers constituting the coating or only an outer layer or several outer layers are peeled off.

Alternatively, the cutting line can extend spirally over the gel layer, thus allowing to peel-off the gel-layer in a continuous spiral.

This spiral peeling, wherein the complete gel layer can be peeled off in one piece, has an interesting play-value and renders the product very attractive.

According to a preferred embodiment of the invention, the product comprises a holder stick having an upper portion which is inserted into the core. This allows easy handling and consumption. The consumer can hold the stick with one hand, and peel off the gel layer with the other hand or using the teeth. Alternatively it is also possible to make products without a stick, for example in a dome shape or in a shape imitating the shape of a fruit such as an apple or a pear. These products can then be consumed as a dessert using a plate and a spoon.

According to a preferred embodiment of the invention, the gel layer comprises one or more gelling hydrocolloids, in particular a polyanionic gelling hydrocolloid. This leads to the desired consistency and peelablity. Gelling properties can be achieved by various stabilisers and combinations thereof. A overview of stabilisers used in ice cream and indications on its gelling properties can be found in literature such as "Ice Cream, Sixth Edition, R. T. Marshall, H. D. Goff, R. W. Hartel eds., Kluwer Academic/Plenum Publishers, 2003. Optionally the gel layer can comprise a gelation controller or inhibitor. This reduces the texture degradation that normally occurs when a gel is stored hot in its liquid state for a longer time, or when it is cooled down and then reheated. According to a preferred embodiment of the invention, the gel layer is made using a recipe as described in EP 1339290 B1 or its US equivalent U.S. Pat. No. 6,548,097 B1, both of which are incorporated herein by reference. In principle, any recipe that allows it to make a gel can be envisaged.

Preferably each gel layer has a thickness of between 2 and 5 mm. A gel layer which is too thin makes the peeling difficult, since the gel layer may rupture. A gel layer which is too thick is not desirable as it is more difficult to peel, and because of the relatively high sugar content of the gel which has a negative impact on the nutritional characteristics of the product.

When the two layers are designed to stick together to be peeled off by a consumer together, they can be relatively thin. One may for example combine two layers having each a thickness of 2 mm to obtain a total coating thickness of 4 mm. If the two layers shall be peeled off separately, one may chose a slightly higher thickness.

It should also be noted that the gel layer does not have to cover the core completely, but may cover only a part or parts of the product.

In the case of a spiral cutting line, said the cutting line preferably has an inclination of between 3° and 60°, preferably between 5° and 25°, with respect to a plane extending perpendicularly to the symmetry axis of the spiral. In the case where the product comprises a stick, this axis corresponds to the axis of the inserted stick.

The cutting line can either be straight to form a simple spiral or ondulated. There may be several such cutting lines, e.g. two cutting lines extending spirally forming a double helix.

The frozen confection forming the core can comprise ice cream, water ice, sherbet, or sorbet, and obviously any flavor can be chosen.

According to the invention, the method for manufacturing the frozen confectionery product comprises the following steps:
- filling a first mix into a mould, freezing the mix so that it forms a first frozen gel layer in the mould and sucking off the excess mix,
- filling a second mix into a mould, freezing the mix so that it forms a second frozen gel layer in the mould and sucking off the excess mix, thereby obtaining a shell consisting of two frozen gel layers forming a coating,
- filling a third mix forming the core consisting of a frozen confection into said shell,
- freezing and demoulding the product, and
- cutting the at least one cutting line into the frozen gel coating.

It should be noted that the product according to the invention can also be made in an extrusion process. In this case the core is extruded in the desired shape, for example in a bar shape, and then coated with the gel layers.

As already mentioned above, it is possible to coat only a part of the product with the gel layer.

When parallel, longitudinal cutting lines are desired, these can be cut into the gel layer using several blades arranged in such a manner that when the product is lowered between these blades and then pulled out, the lines are cut into the gel coating.

It should be noted that, although the cutting lines preferably extend through the entire gel coating, so that it can be peeled off entirely, they can also only cut through an outer gel layer, leaving an inner gel layer intact. This results then in a product where only the outer gel layer can be peeled off, revealing an inner gel layer having preferably a different colour.

In principle it is also possible to have different cutting lines in the inner layer that have been cut or created in a previous step.

To cut spiral cutting line into the gel coating, a cutting tool as described in the International Patent Application PCT/CN11/077465 filed on Jul. 22, 2011 can be used. The content of this application is herewith incorporated by reference.

Apart from a single cutting line extending spirally, two spiral cutting lines can be produced forming a double-helix pattern. Also 3 or more cutting helices can be used.

Besides parallel longitudinal cutting lines for a banana-style peeling effect or a spiral cutting line for a spiral peeling, virtually any desired pattern of cutting lines can be used and cut into the gel coating with an appropriate cutting device. One may for example cut rectangles or other shapes into a gel layer that can be peeled off, thereby forming window-like spaces without through which either a second gel layer lying underneath, or the core appears.

FIGURES

The present invention is further described hereinbelow referring to the accompanying drawings which illustrate one preferred embodiment of the invention.

EXAMPLE

Figure 1:
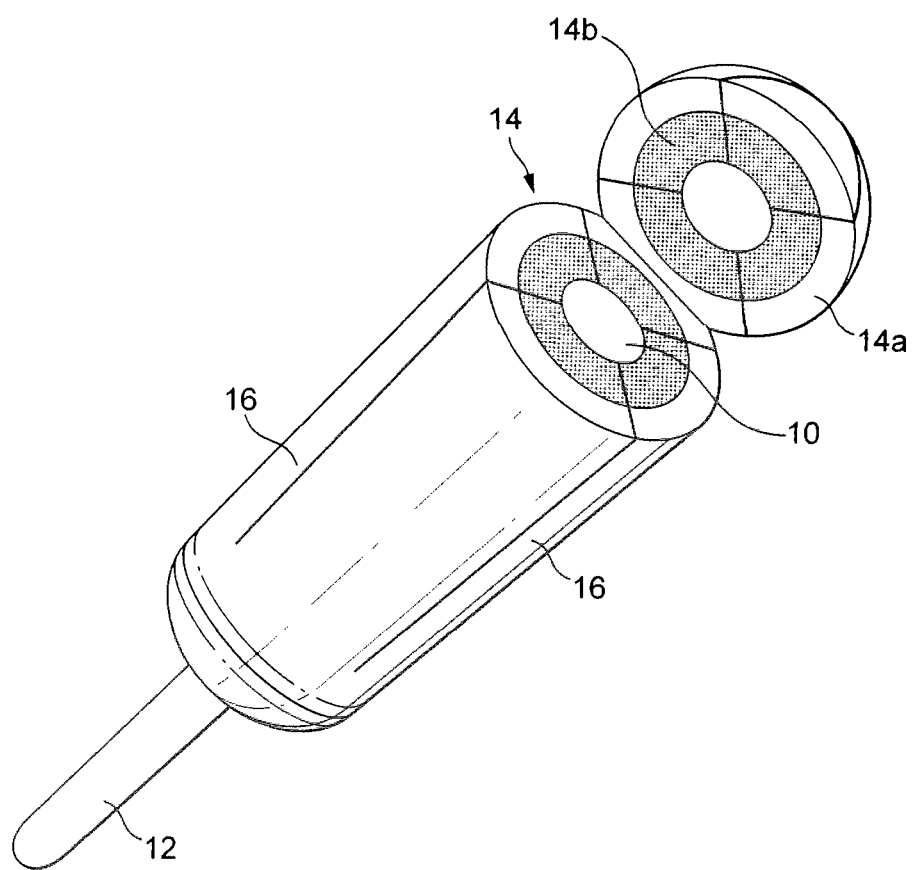
FIG. 1 shows a cut through an example of a frozen confectionery product according to the invention.
Figure 2:
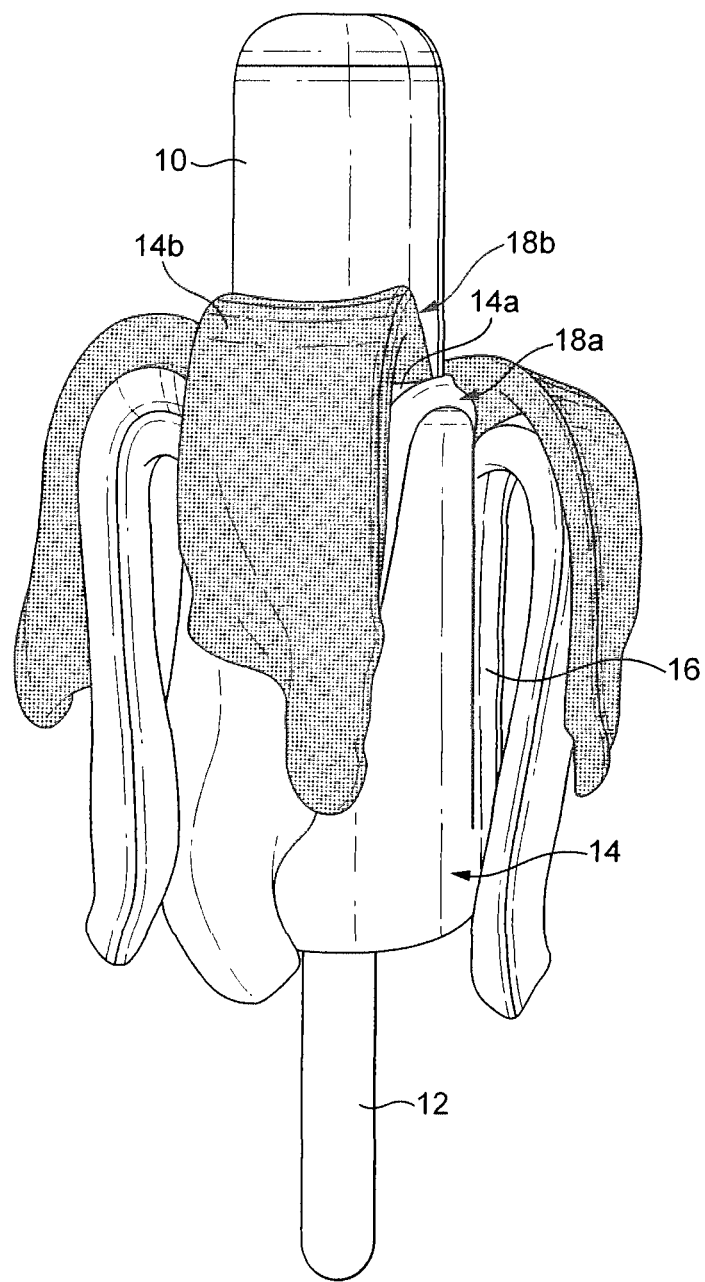
FIG. 2 shows the product of FIG. 1 with the gel layers being partially peeled off

FIGS. 1 and 2 show a frozen confectionery product according to the invention which comprises a cylindrical ice-cream core 10 (cf. FIG. 2) which is completely coated with a frozen flexible edible gel coating 14 consisting of two gel layers 14a, 14b having different colours. Four cutting lines 16 extend longitudinally over the gel coating 14 through both gel layers 14a, 14b, and allow to peel-off each of the two gel-layers 14a, 14b separately in four stripes 18a, 18b (cf. FIG. 2).

The product is produced as follows:

For the two gel layers, a basic mix is prepared according to the following recipe:

| | |
|---|---|
| Corn syrup solids | 10% |
| Sucrose | 25% |
| Citric acid | 0.5% |
| Carrageenan | 0.4% |
| Locust bean gum | 0.3% |
| Colors, flavors | 1% |
| Remainder is water | |

For the first gel layer, a first colorant is added to the basic mix, so that a first mix having a first color is obtained. For the second gel layer, a different colorant is added to the basic mix, so that a second mix having a second color is obtained.

The first mix is pasteurized at 85° C. for 30 seconds and filled into moulds at a mix temperature of 50 C.

As already mentioned above, it is also possible to use a recipe containing in addition to a polyanionic gelling hydrocolloid, or any other gelling agent, a gelation controller or inhibitor. In particular one of the recipes described in EP 1339290 B1 or U.S. Pat. No. 6,548,097 B1 can be used. In this case the mix can be cooled down after its preparation and stored in the cooled down state. Due to the added gelation controller or inhibitor it can be kept in this state for a relatively long period of time without any degradation. Before use, the mix is reheated, additives that will trigger the gelation are added, and the mix is then processed in the same way as the mix without gelation controller or inhibitor.

The moulds containing the first gel mix are cooled in a cold brine bath until a frozen layer with a thickness of around 2 to 5 mm is formed. The remaining mix, which is still liquid, is then sucked back out of the mould.

One thereby obtains a shell of edible, flexible frozen gel in the mould.

In the following step, this operation is repeated with the second gel mix having a different color, so that a second shell inside the outer shell formed in the previous step is obtained.

The shells are then filled with a standard vanilla ice cream mix. A wooden stick is inserted into the product and the product is frozen completely.

Once frozen, the product is demoulded. For the demoulding, the mould is warmed up through a warm liquid that is sprayed on the outside of the mould. This allows the surface layer of the product to warm up slightly and to soften, so that demoulding is facilitated.

In the following step, the cutting lines are cut into the gel layer 14 using a set of knives arranged around a void. The product can be held on the stick and lowered into this void, so that the knives cut four lines 16 into the gel coating 14, cutting through the outer gel layer 14a and the inner gel layer 14b.

As it is illustrated in FIG. 2, the two gel layers 14a, 14b at the surface can be peeled off from the product core in flaps similar to the effect obtained when peeling a banana.

REFERENCE NUMERALS

10 Core
12 Stick
14 Gel Coating
14a outer Gel Layer
14b inner Gel Layer
16 Cutting Line
18a, 18b Gel Stripes

The invention claimed is:

1. A frozen confectionery product comprising:
a core comprising a frozen confection, the core is at least partially coated with a frozen flexible edible gel coating, the gel coating being provided with at least one cutting line allowing one to peel-off the gel-coating at least partially, the gel coating comprises at least two successive gel layers in contact with each other; wherein the gel layers are visually distinct from each other and at least one of the visually distinct gel layers is frozen separately from another visually distinct gel layer so as to be peeled off the core separately relative to each other.

2. The frozen confectionery product according to claim 1, wherein the two gel layers have different colors relative to each other.

3. The frozen confectionery product according to claim 1, comprising a holder stick comprising a portion which is inserted into the core.

4. The frozen confectionery product according to claim 1, wherein the gel coating comprises a gelling hydrocolloid.

5. The frozen confectionery product according to claim 4, wherein the gel coating comprises a gelation controller or inhibitor.

6. The frozen confectionery product according to claim 1, wherein each gel layer has a thickness between 2 and 5 mm.

7. The frozen confectionery product according to claim 3, wherein several cutting lines extending across the gel coating parallel to the holder stick are provided, allowing the coating to be peeled off in substantially parallel stripes.

8. The frozen confectionery product according to claim 1, wherein the cutting line extends spirally across the gel coating to be peeled off in a spiral.

9. The frozen confectionery product according to claim 8, wherein the cutting line has an inclination of between 3° and 60° with respect to a plane extending perpendicularly to the symmetry axis of the spiral.

10. The frozen confectionery product according to claim 1, wherein the cutting line is undulated.

11. The frozen confectionery product according to claim 1, wherein the frozen confection forming the core comprises a product selected from the group consisting of ice cream, water ice, sherbet, and sorbet.

12. A method for manufacturing a frozen confectionery product comprising the steps:
filling a first mix into a mold, freezing the first mix so that the first mix forms a first frozen gel layer in the mold and sucking off the excess mix;
filling a second mix into the mold, freezing the second mix so that the second mix forms a second frozen gel layer in the mold and sucking off the excess mix, thereby obtaining a coating shell consisting of two visually distinct successive frozen gel layers in contact with one another;
filling a third mix forming the core consisting of a frozen confection into the shell;
freezing and demolding the first mix, the second mix and the third mix from the mold; and
cutting at least one cutting line into the frozen gel coating to form the frozen confectionery product; wherein the cutting line allows one to peel off the gel coating at least partially and the product comprises at least two visually distinct gel layers that can be peeled off the core separately relative to one another.

13. The frozen confectionery product according to claim 1, wherein the visually distinctive gel layers comprise a first gel layer and a second gel layer, and the product is made by a process comprising:
filling a first mix into a mold, freezing the first mix so that the first mix forms the first gel layer in the mold, and sucking off an excess portion of the first mix;
filling a second mix into a mold, freezing the second mix so that the second mix forms the second gel layer in the mold, and sucking off an excess portion of the second mix;
filling a third mix into the frozen flexible edible gel coating to form a composition consisting of the core at least partially coated with the frozen flexible edible gel coating;
freezing and demolding the composition; and
cutting the at least one cutting line into the frozen gel coating to form the frozen confectionery product.

14. The frozen confectionery product according to claim 1, wherein the visually distinct gel layers comprise an outer gel layer and an inner gel layer, the inner gel layer comprises first cutting lines, the outer gel layer comprises second cutting lines, and the first cutting lines are positioned differently relative to the second cutting lines.

15. The frozen confectionery product according to claim 1, consisting of the core and the visually distinct gel layers.

16. The frozen confectionery product according to claim 3, consisting of the core, the visually distinct gel layers, and the holder stick.

\* \* \* \* \*